July 18, 1961

J. A. HARDISON 2,992,788

SUPPORTING DEVICE

Filed March 28, 1960

INVENTOR.

JOHN A. HARDISON

BY Arthur H. Swanson

ATTORNEY.

United States Patent Office 2,992,788

Patented July 18, 1961

2,992,788

SUPPORTING DEVICE

John A. Hardison, Rockville, Md., assignor to Minneapolis-Honeywell Regulator Company, Minneapolis, Minn., a corporation of Delaware Filed Mar. 28, 1960, Ser. No. 18,097

5 Claims. (Cl. 242—68.3)

This invention relates to reel supporting devices. More specifically, the present invention relates to a reel hub-fastener.

An object of the present invention is to provide an improved reel hub-fastener for securely fastening any of a number of different sized reels such as magnetic tape reels on the associated apparatus.

Another object of the present invention is to provide an improved reel hub-fastener for fastening such reels in a firm driving relation and which features a rapid reel-changing facility.

A further object of the present invention is to provide an improved reel hub-fastener, as set forth, which is characterized by simplicity of operation and construction.

In accomplishing these and other objects, there has been provided, in accordance with the present invention, a reel hub fastener having a plurality of reel-retaining tabs. The tabs are mounted on the periphery of a rotatable locking ring which ring is mounted on one end of a reel hub and is spring biased toward a flange on a second end of the reel hub. In the unlocked position, the retaining tabs are aligned with corresponding reel locating tabs on the reel hub. In the unlocked condition, however, the distance between the retaining tabs and the flange is less than the thickness of the reel. After the reel is positioned on the hub as referenced by the aforesaid two sets of tabs, the rotatable ring is rotated through a small arc to cause the locking tabs to ride out of the reel cut-outs onto the outside surface of the reel. In this position, the aforesaid spring-bias is effective to lock the reel between the locking tabs and the flange. The locking ring is held in both of the two aforesaid positions by spring-biased pins located in the side of ring facing the flange. The pins are provided with mating holes in the reel hub in the locked and unlocked positions of the ring.

A better understanding of the present invention may be had from the following detailed description when read in connection with the accompanying drawings, in which.

Figures 1, 2, 3:
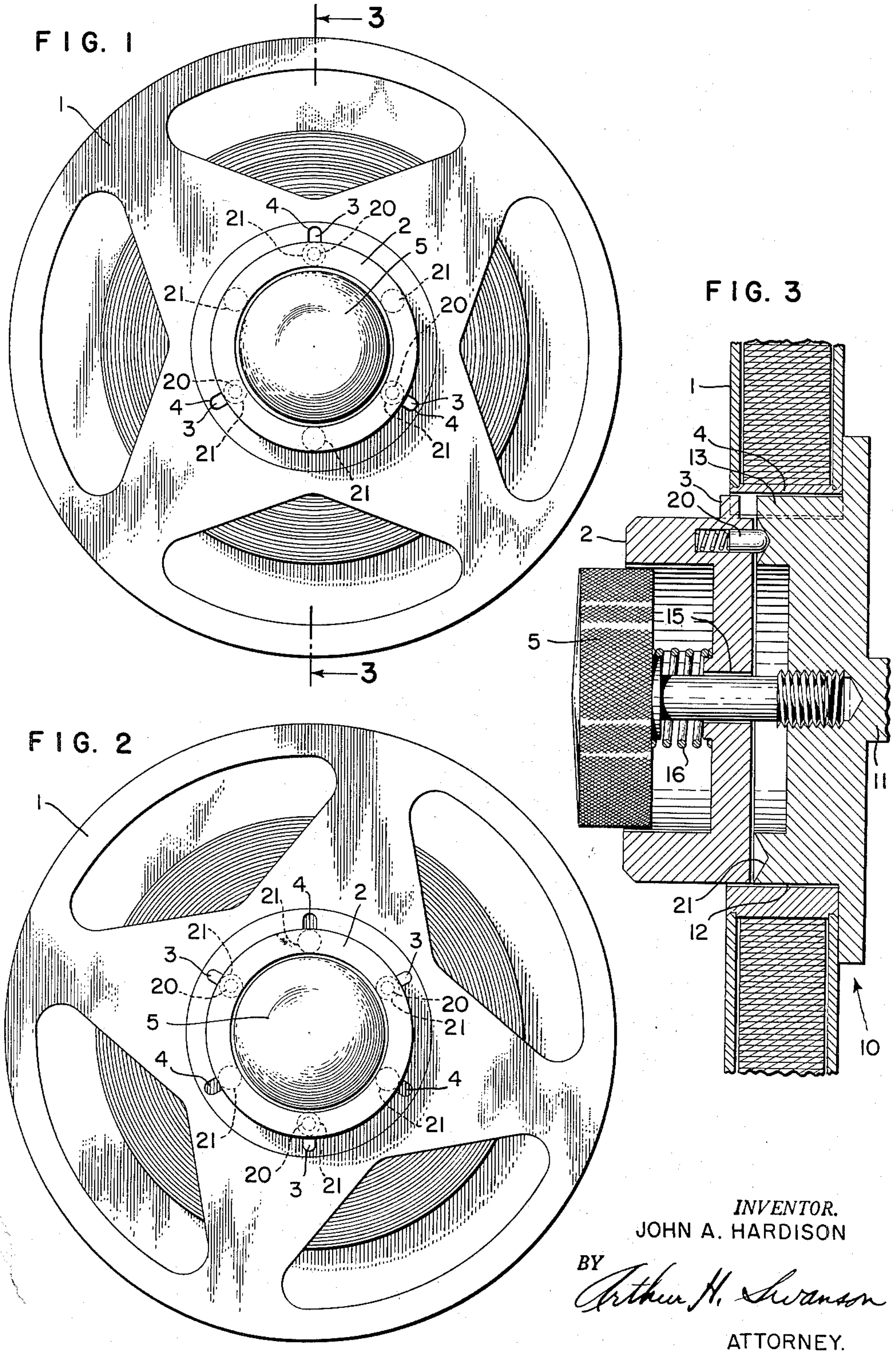
FIG. 1 is a pictorial representation of a front view of a reel hub-fastener embodying the present invention in an unlocked condition.
FIG. 2 is a pictorial representation of a front view of the reel hub-fastener shown in FIG. 1 but in a locked condition.
FIG. 3 is a cross-sectional representation of the reel hub-fastener as shown in FIG. 1.

Referring to FIG. 1, there is shown a front view of a reel hub having a reel hub-fastener and a reel 1 mounted thereon. A locking ring 2 having a plurality of locking tabs 3 is positioned with the tabs 3 aligned with corresponding reel cut-outs 4. A hub cap 5 is attached to the front of the reel hub.

In FIG. 3, there is shown a cross-sectional representation of the reel hub-fastener and reel hub as shown in FIG. 1 with the reel 1 shown in a partial representation. A reel hub flange 10 is driven by any suitable driving means, not shown, connected to a flange driving shaft 11. A cylindrical extension from the flange 10 is arranged to form a reel hub 12. The reel hub 12 has a single integral reel locating tab 13 used to circumferentially locate the reel 1 and to transmit the rotary motion of the hub 12 thereto. The rotatable locking ring 2 is positioned in axial alignment with reel hub 12 with a ring diameter similar to the diameter of the reel hub 12.

The hub cap 5 is attached to the hub 12 by a threaded extension passing through a center hole 15 in the locking rings 2 into a threaded hole in the hub 12. Further, the hub cap 5 is arranged to have a diameter substantially less than the diameter of the locking ring 2. A spring 16 is positioned around the aforesaid threaded extension between the hub cap 5 and the locking ring 2 to exert a pressure on the ring 2 to urge the ring 2 toward the flange 10. A plurality of spring-biased pins 20 are located in the locking ring 2 adjacent to the locking tabs 3, on the side thereof facing the reel hub 12. The pins 20 are spring-biased toward the reel hub 12 to mate with a plurality of corresponding holes 21 in the reel hub 12. The holes 21 are arranged in the reel hub 12 in two groups. A first group of holes 21 accepts the pins 20 in the unlocked position of the ring 2 and a second group of holes 21 accepts the pins 20 in the locked position of the ring 2. Further, the holes 21 have tapered sides to allow the pins 20 to slide in and out thereof as the ring 2 is rotated. Thus, the pins 20 are effective to hold the ring 2 in one of the two aforesaid positions without preventing a desired repositioning of the ring 2.

In operation, the locking ring 2 is rotated until the locking tabs 3 are aligned with the locating tab 13 and the pins 20 are in a first group of the holes 21. The reel 1 is then positioned on the reel hub 12 with the reel cut-outs 4 therein fitting over the two sets of tabs 3 and 13. The locking ring 2 is, subsequently, rotated through a small arc to a locked condition as shown in FIG. 2. Since as previously discussed, the locking tabs 3 in an unlocked position are closer to the backing plate 10 than the thickness of the reel 1, the aforesaid rotation is effective to force the locking tabs 3 to ride out of the cut-outs 4 onto the surface of the reel 1. This motion of locking tabs 3 is effective to move the locking ring 2 toward the hub cap 5 thereby to compress the spring 16. This compression produces a force on the reel 1 through the locking tabs 3 to press the reel 1 against the flange 10. Further, the aforesaid rotation is effective to displace the pins 20 from the first group of the holes 21 to a second group corresponding to the locked position of the locking ring 2 whereby the ring 2 is retained in the locked position. Thus, in the locked condition, the reel 1 is securely aligned on the hub 12 by the locating tabs 13 and fastened to the flange 10 by the locking tabs 3.

To remove the reel 1 from the reel hub 12, the locking ring 2 is returned to the position whereat the locking tabs 3 are aligned with the locating tab 13 and the pins 20 are returned to the first group of holes 21. This position, of course, is indicated by a dropping of the locking tabs 3 from the surface of the reel 1 into the reel cut-outs 4. The spring 16 is no longer effective to exert a force on the reel 1, and the removal of the reel 1 may be effected.

Thus, it may be seen that there has been provided, in accordance with the present invention, a reel hub-fastener for securely retaining a reel upon a reel hub in a reel driving relation while featuring a rapid reel-changing facility.

What is claimed is:

1. A reel hub-fastener for fastening a reel thereon comprising a reel hub having a plurality of locating tabs, said reel hub having a peripheral flange, said flange being located at one end of said hub, a hub-end cap, said cap being connected to a second end of said hub, a rotatable locking ring having a plurality of locking tabs, said ring being located between said cap and said second end of said hub, and a spring means between said cap and said ring for urging said ring toward said flange, said locking ring having an unlocked position wherein said locating tabs and said locking tabs are in alignment and the distance between said locking tabs and said flange is less than the thickness of said reel.

2. A reel hub-fastener for fastening a reel thereon comprising a reel hub having a single locating tab, said reel hub having a peripheral flange, said flange being located at one end of said hub, a hub-end cap, said cap being connected to a second end of said hub, a rotatable locking ring having a plurality of locking tabs, said ring being located between said cap and said second end of said hub and a spring means between said cap and said ring for urging said ring toward said flange, said locking ring having an unlocked position wherein said locating tab is in alignment with one of said locking tabs and the distance between said locking tabs and said flange is less than the thickness of said reel.

3. A reel hub-fastener for fastening a reel thereon comprising a reel hub having a plurality of locating tabs, said reel hub having a peripheral flange, said flange being located at one end of said hub, a hub-end cap, said cap being connected to a second end of said hub, a rotatable locking ring rotatable between a first and a second position and having a plurality of locking tabs thereon, said ring being located between said cap and said second end of said hub, a plurality of spring-biased pins arranged in said ring adjacent to said second end of said hub, recess means in said second end of said hub for mating with said pins when said ring is in either of said two positions, and a spring means between said cap and said ring for urging said ring toward said flange, said locking ring having an unlocked position wherein said locating tabs and said locking tabs are in alignment and the distance between said locking tabs and said flange is less than the thickness of said reel.

4. A reel hub-fastener for fastening a reel thereon comprising a reel hub having a plurality of locating tabs, said reel hub having a peripheral flange, said flange being located at one end of said hub, a hub-end cap, said cap being connected to a second end of said hub, a rotatable locking ring having a plurality of locking tabs thereon, said ring being located between said cap and said second end of said hub, and being rotatable from a first to a second position whereby to fasten and unfasten said reel, respectively, a plurality of spring-biased pins arranged in said ring adjacent to said second end of said hub, recess means in said second end of said hub for mating with said pins in either of said two positions of said ring, and a spring means between between said cap and said ring for urging said ring toward said flange, said ring in said second position having said locking tabs and said locating tabs in alignment and having a separation from said flange which distance is less than the thickness of said reel.

5. A reel hub-fastener for fastening a reel thereon comprising a reel hub having a plurality of locating tabs, said reel hub having a peripheral flange, said flange being located at one end of said hub, a hub-end cap, said cap being connected to a second end of said hub, a rotatable locking ring arranged in axial alignment with said hub and rotatable between a first and a second position, a plurality of locking tabs arranged on the outer periphery of said ring, said ring having an outer diameter similar to the outer diameter of said hub and being located between said cap and said second end of said hub, a plurality of spring-biased pins arranged in said ring adjacent to said second end of said hub, recess means in said second end of said hub for mating with said pins in either of said two positions of said ring, and a spring means between said cap and said ring for urging said ring toward said flange, said ring in said second position having said locking tabs and said locating tabs in alignment and having a separation from said flange which distance is less than the thickness of said reel.

References Cited in the file of this patent

UNITED STATES PATENTS

| | | |
|---|---|---|
| 2,882,078 | MacDonald | Apr. 14, 1959 |
| 2,928,620 | Staurakis et al. | Mar. 15, 1960 |